USO08358894B2

(12) United States Patent
Martin-Regalado et al.

(10) Patent No.: US 8,358,894 B2
(45) Date of Patent: Jan. 22, 2013

(54) OPTICAL CABLE WITH IDENTIFIABLE OPTICAL FIBERS

(75) Inventors: Josep Martin-Regalado, Milan (IT); Josep Maria Batlle i Ferrer, Milan (IT); Raul Gil, Milan (IT); Valentina Ghinaglia, Milan (IT)

(73) Assignee: Prysmian S.p.A., Milan (IT)

( * ) Notice: Subject to any disclaimer, the term of this patent is extended or adjusted under 35 U.S.C. 154(b) by 13 days.

(21) Appl. No.: 12/986,837

(22) Filed: Jan. 7, 2011

(65) Prior Publication Data

US 2011/0188041 A1 Aug. 4, 2011

Related U.S. Application Data

(63) Continuation of application No. PCT/EP2008/058919, filed on Jul. 9, 2008.

(51) Int. Cl.
G02B 6/44 (2006.01)
G02B 6/02 (2006.01)

(52) U.S. Cl. .............. 385/109; 85/100; 85/110; 85/112; 85/113; 85/123; 85/126; 85/127; 85/128

(58) Field of Classification Search .................. 385/109, 385/110, 112, 113, 128
See application file for complete search history.

(56) References Cited

U.S. PATENT DOCUMENTS

| 5,377,292 | A | 12/1994 | Bartling et al. |
| 5,796,905 | A | 8/1998 | Hoffart et al. |
| 6,404,972 | B1 | 6/2002 | Pasch et al. |
| 6,904,212 | B2 | 6/2005 | Ma |
| 2003/0016924 | A1 | 1/2003 | Thompson et al. |
| 2003/0108311 | A1 | 6/2003 | Ma |
| 2007/0031096 | A1* | 2/2007 | Moorjani et al. ............. 385/128 |

OTHER PUBLICATIONS

International Search Report from the European Patent Office for International Application No. PCT/EP2008/058919, (mailing date May 6, 2009).
TIA Standard, "Optical Fiber Cable Color Coding," TIA-598-C, (Revision of TIA/EIA-598-B), Telecommunications Industry Association, Jan. 13, 2005, pp. 1-21.

* cited by examiner

*Primary Examiner* — Ryan Lepisto
(74) *Attorney, Agent, or Firm* — Finnegan, Henderson, Farabow, Garrett & Dunner, L.L.P.

(57) ABSTRACT

A optical fiber includes an optically transmissive element; at least one curable colored layer surrounding the optically transmissive element; and an additional removable colored layer surrounding and homogeneously covering the curable colored layer. The presence of the additional removable colored layer improves identifiability of the fiber, especially when the latter is included in an optical cable together with other fibers.

7 Claims, 2 Drawing Sheets

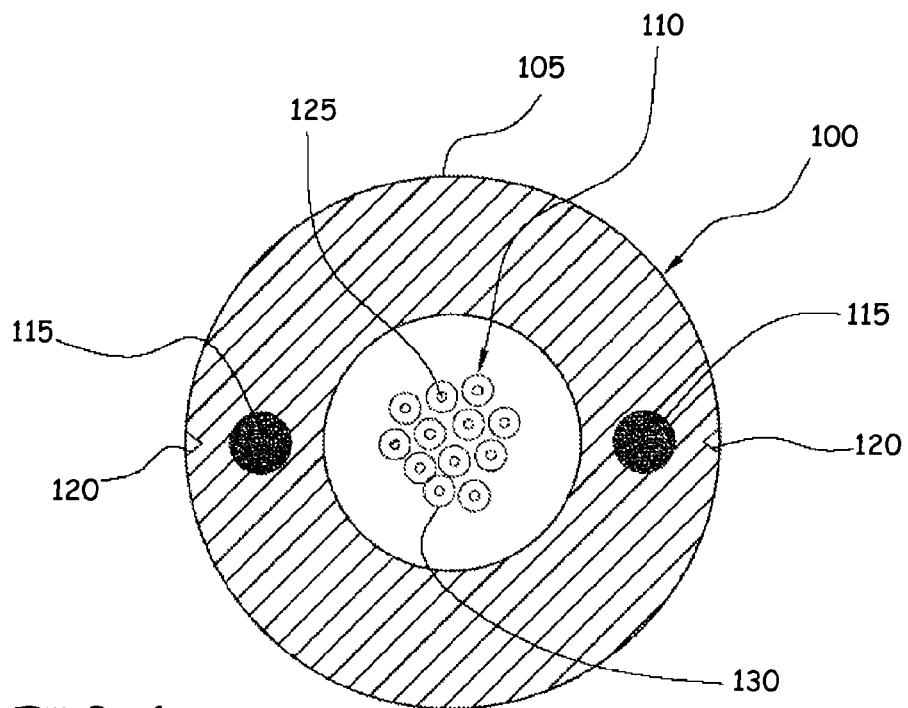
FIG. 1
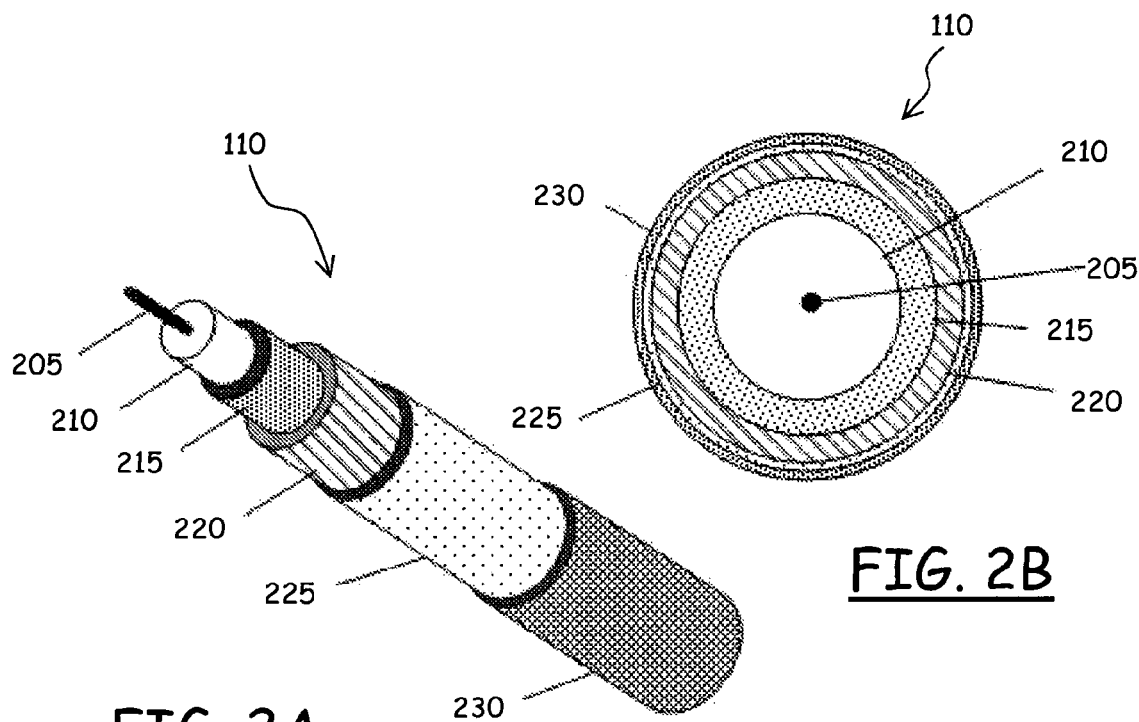
FIG. 2A
FIG. 2B

OPTICAL CABLE WITH IDENTIFIABLE OPTICAL FIBERS

CROSS REFERENCE TO RELATED APPLICATION

This application is a continuation patent application of International Application No. PCT/EP2008/058919, filed Jul. 9, 2008, the content of which is incorporated herein by reference.

BACKGROUND OF THE INVENTION

1. Field of the Invention

The present invention generally relates to an optical cable comprising optical fibers identifiable by coloring, to an optical fiber identifiable by coloring, to a method for identifying an optical fiber and to the manufacturing of optical cables comprising identifiable optical fibers.

2. Description of the Related Art

An optical fiber typically comprises a core, generally made of glass, and a surrounding cladding; the core and the cladding form the optical waveguide structure, and hereinafter they will also be collectively referred to as the "transmissive element" of the optical fiber.

One or more coating layers are typically applied over the cladding. For example, two superposed coating layers are often provided. The layer which is in direct contact with the transmissive element is usually called inner coating (or primary coating), whereas the overlaying layer is called outer coating (or secondary coating).

Typically, like in the telecommunications field, optical fibers are used in optical cables, i.e. they are "cabled". Optical cables are used, for example, for connecting customer premises to an optical communications network.

Optical cables generally comprise a plurality of optical fibers, contained in, e.g., buffer tubes, preferably loosely confining the optical fibers in a number for instance variable from 6 to 48 or even more, depending on the specific application. The optical fibers may optionally be gathered in groups of, for example, more than 12.

For sake of simplicity and unless otherwise stated, in the following the term "optical cable" shall collectively refer to optical cables themselves, but also to buffer tubes.

After cabling, the individual fibers should be still readily distinguishable from each other so they can be accurately identified during, for example, installation (connecting ad splicing) and repair.

Color coding can be used to distinguish and identify individual fibers in a multi-fiber optical cable. For example, a colorant can be added to the coating materials, usually to the outer coating material; alternatively, an additional layer containing a colorant can be provided at least partially overlaying the fiber outer coating.

According to TIA-598-C (Telecommunication Industry Association) color specifications, a dozen of different colors can be used to discriminate the fibers, thus when the number of fibers inside a cable is large, particularly greater than 12, the limited number of colors available may result insufficient, and additional implements are required for identifying the fibers.

Current solutions are known which are based on i) adding indicia, such as rings or stripes, over or in the colored layer; or ii) using colored yarns to segregate groups of fibers within the optical cable.

For example, U.S. Pat. No. 6,904,212 discloses a method for coloring an optical fiber. The method comprises applying a base color coating of a first curable material having a base color to an optical fiber core section. At least one stripe of a second curable material is applied to the base color coating before these coatings are fully cured. The stripe has a stripe color different from the base color. The stripe is preferably formed in the base color coating such that a diameter of the colored optical fiber remains substantially uniform.

U.S. Pat. No. 6,404,972 relates to a color-coded optical fiber with a fiber core and the cladding made e.g. of a quartz glass, having a coating, which comprises one or several plastic casings to protect the fiber. Immediately above this coating is a color coding in the form of open colored rings spaced in the perimeter direction. In order to let such an open colored ring appear optically as a full ring for the better identification of each fiber, and at the same time to positively prevent any wear of the color coding during further processing, a transparent or translucent layer is provided which covers the color coded fiber along its entire length. Further color variations and thereby further differentiating possibilities are provided if the further layer is colored or dyed. In this way perhaps black or blue single or double rings can be covered by a yellow, red or green-dyed further layer of resin. The colored and essentially open single or double rings can be easily identified as full rings since the colored further layer is at least translucent. The selection of contrasting color combinations facilitates the identifiability of the coded fiber.

U.S. Pat. No. 5,796,905 discloses an optical fiber with a color marking. An optical fiber has a fiber core and cladding made for example of quartz glass, having a coating, which is composed of one or more plastic coatings to protect the fiber. A color marking in the form of spaced colored rings is placed directly on this coating. A further transparent or translucent layer, which covers the entire length of the color-identified fiber, is provided. Further color variations, and thereby further distinguishing possibilities, are provided if the further layer is colored or dyed. The colored single or double rings can be easily identified, since the further colored layer is at least translucent. The selection of contrasting color combinations makes the marked fiber more identifiable. Another embodiment provides a fiber made of glass or plastic covered by a coating that in turn contains the color marking. This color marking comprises lengthwise running dashes or lines of any color, where this marking is either applied directly to the coating or is applied thereto if a uniform lengthwise extending color marking, which itself is colored, is applied to the coating. Like the colored rings, the dash or line markings can contrast against the surface of the plastic used for the coating, but the dashes or lines can also be integrated into the plastic material. In all instances, the further layer is provided to protect the color marking, and for the purpose of precisely distinguishing between the multitude of optical fibers in cables by means of any marking configurations. In another embodiment the optical fiber is surrounded by the coating, specifically a "coating" in the case of glass fibers, to which the color marking is applied directly, or over an intermediate layer which is colored throughout. In the illustrated embodiment, it comprises spaced dashes or lines. These broken dashes or lines, possibly at different distances from each other, are covered by the further layer, which covers the entire optical fiber. Another differentiation of fibers marked in this manner is provided, if the further layer is made of a translucent resin, the color of which can be distinguished from the colors or color combinations located underneath.

U.S. Pat. No. 5,377,292 relates to an optical fiber with one or more protective coverings of polymeric materials and a color coating of UV-hardened varnish on an outer surface of a last protective covering, wherein a different color identification marking material is interposed between parts of the color coating before hardening.

SUMMARY OF THE INVENTION

The Applicant has observed that the known solutions for optical fiber identification within optical cables are not totally satisfactory.

Those solutions involving the addition of indicia such as rings or stripes over or in the colored layer; or using colored yarns to segregate groups of fibers, imply complication (economical, but also in term of speed) of the manufacturing process. In the case of indicia provided over the colored layer, the fiber diameter can result not uniform and can add attenuation to the fiber and degrade the performance thereof.

Concerning the solution disclosed in U.S. Pat. No. 6,904, 212, the Applicant observes that the proposed fiber coloring method is complicated. The resulting optical fiber has two colors in the same layer.

In the solutions of U.S. Pat. No. 6,404,972 and U.S. Pat. No. 5,796,905, the optical fiber has two colors, but one of them is provided in a discontinuous manner over the coatings. The two colors are simultaneously visible.

In U.S. Pat. No. 5,377,292, the optical fiber has two colors in the same layer. The two colors are simultaneously visible.

The Applicant observes that the three references above disclose permanent colored coatings which cannot be removed.

The Applicant found that optical fibers comprising at least one colored layer can be readily identified by subdividing them into groups. All of the fibers of each group are provided with an additional homogeneous layer containing the same colorant for that group. The additional layer hides the underlying coating layers and is removable. Each fiber group has a different color layer which allows an easy and fast "first-view" identification of the fiber groups. The individual fibers can be then easily identified by removing the additional colored layer.

The identifiability of optical fibers is easily attained by providing an optical fiber, in addition to the conventional coloring layer, with the additional homogeneous, external colored layer completely surrounding and covering the optical fiber, easily removable to expose to the sight the underlying coloring layer.

According to an aspect, the present invention relates to an optical fiber comprising:
 an optically transmissive element;
 at least one curable colored layer surrounding the optically transmissive element;
 an additional removable colored layer surrounding and homogeneously covering the curable colored layer.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The optical fibers according to the invention comprise at least one coating layer, preferably two coating layers, i.e. an inner coating layer surrounding the transmissive element and surrounded by an outer coating layer.

The at least one curable colored layer can be one of the inner and outer coating layers, preferably the outer coating layer provided with a colorant. Alternatively, the at least one colored layer is a coating containing a colorant superposed on the at least one coating layer.

In the present description and claims as "curable colored layer" is meant a layer, containing a colorant, made of a material cross-linking by means of UltraViolet (UV) or Infra-Red (IR) irradiation. In the finished optical fiber said "curable colored layer" is intended as having been suitably cured.

The additional removable colored layer can be an ink layer, preferably a solvent-based ink.

The additional colored layer is removable, for example, by application of one or more of solvent or by scratching.

Advantageously, the additional removable colored layer has a substantially uniform thickness. For example, said colored layer has a thickness of about 25 μm.

Preferably, the additional removable colored layer is based on a material comprising at least one pigment and a polar matrix, for example water, alcohol such as ethanol or methanol, ester such as ethyl acetate, ketone such as methyl-ethyl ketone, or mixtures thereof. Preferably, the at least one pigment is an organic compound.

The optical fibers of the present invention can be contained, typically loosely, in an optical cable and/or in a buffer tube as will be shown in exemplary embodiments.

In another aspect, the present invention relates to an optical cable containing at least two optical fibers comprising:
 an optically transmissive element;
 at least one curable colored layer surrounding the optically transmissive element;
 an additional removable colored layer surrounding and homogeneously covering the colored layer;
 said optical fibers having the at least one curable colored layer of the same color and differing in the color of the additional removable colored layer.

Preferably, the optical cable according to the invention contains more than twelve optical fibers.

Preferably, the optical cable according to the invention contains at least two groups of optical fibers differing in the color of the additional removable colored layer.

In the optical cable according to the invention the optical fibers can be contained in at least one buffer tube.

When more than one buffer tube is present in the optical cable, said buffer tube can be in a coaxial or stranded configuration.

Optionally, the cable of the invention contains reinforcing elements.

In a further aspect, the present invention relates to a method for identifying an optical fiber in an optical cable comprising the steps of:
 providing at least two optical fibers comprising an optically transmissive element, at least one curable colored layer surrounding the optically transmissive element, and an additional removable colored layer surrounding and homogeneously covering the colored layer; said two optical fibers having the additional removable colored layer of the same color and differing in the color of the at least one curable colored layer;
 accessing the optical fibers;
 removing the additional removable colored layer of an optical fiber to make the color of the of the curable colored layer visible.

Preferably, the invention relates to a method for identifying an optical fiber in an optical cable comprising at least a first group of optical fibers as described above having the additional removable colored layer of the same color and differing in the color of the at least one curable colored layer, and a second group of optical fibers as described above having the additional removable colored layer of the same color and differing in the color of the at least one curable colored layer, the first and the second groups differing in the color of the additional removable colored layer, the method comprising the steps of accessing the first and second groups of optical fibers;

selecting one of the groups on the basis of the color of the removable colored layer;

removing the additional removable colored layer of at least one optical fiber of the selected group;

identifying the optical fiber on the basis of the color of the curable colored layer.

BRIEF DESCRIPTION OF THE DRAWINGS

These and other features and advantages of the present invention will be made apparent by the following detailed description of some exemplary and non-limitative embodiments thereof, wherein:

FIG. 1 schematically shows, in transversal section, an exemplary optical cable of the invention;

FIGS. 2A and 2B schematically show, respectively in perspective view and in cross-section, an optical fiber according to an embodiment of the present invention.

DETAILED DESCRIPTION OF EMBODIMENTS OF THE INVENTION

Figure 3:
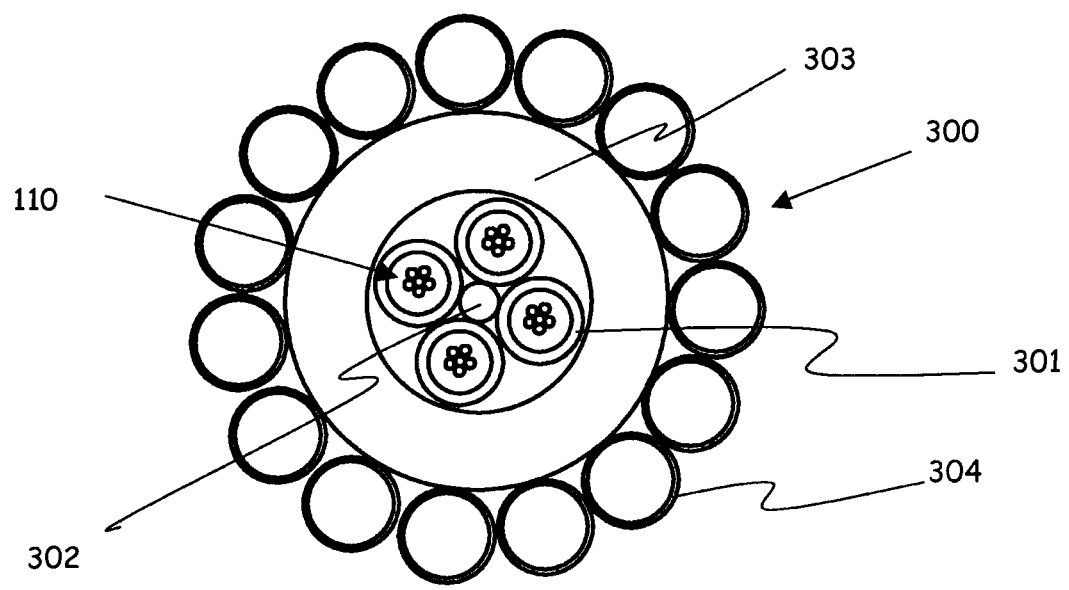
FIG. 3 schematically shows, in transversal section, an exemplary optical cable with buffer tubes according to the invention.

Making reference to the drawings, in FIG. 1 there is schematically shown the cross section of an optical cable 100, of the type used in telecommunications applications, for example for connecting customer premises to an optical communications network. The optical cable 100 includes a buffer tube 105, for instance in polymeric material, that accommodates in its inner hollow space, in relatively loose way, a plurality of optical fibers 110, for instance in a number of 48, depending on the type of optical cable and on the number of premises to be connected to the optical network. Two reinforcing elements 115 are embedded in the material of the sheath 105 and extend longitudinally to the cable, in substantially diametrically opposite positions; the reinforcing elements 115 can be for instance bars of polymeric material (typically a resin) loaded with glass fibers ("Glass Reinforced Polymer" or GRP) or with aramyd fibers. In the external surface of the tube 105, two longitudinal notches 120 are preferably formed, each located in correspondence of a respective reinforcing element 115, useful to allow the personnel entrusted with the operations of installation of the cable and connection of the users to identify the position of the reinforcing elements 115, so as to avoid to cut the latter in the procedure of extraction of the optical fibers 110 for splicing/cabling operations.

Each optical fiber 110 includes a transmissive element 125, constituted by an optically transmissive core surrounded by a cladding; core and cladding are preferably constituted by silica-based material, and the material of the cladding has a refraction index lower than the refraction index of the material of the core, for substantially confining the optical radiation within the core. The transmissive element 125 is covered by an arrangement 130 of coating/colored layers, described in detail hereinafter.

FIG. 3 illustrates another embodiment of the invention. The cable 300 is of the OPGW (Optical Ground Wire) type wherein the optical fibers 110 are loosely contained in buffer tubes 301. In the cable shown, the buffer tubes 301 are stranded around a central reinforcing element 302 made, for example, of a resin loaded with glass fiber. For example, a buffer tube 301 containing 24 optical fibers 110 can have an inner diameter of about 2.7 mm and an outer diameter of about 3.6 mm; a buffer tube 301 containing 36 optical fibers 110 can have an inner diameter of about 3.0 mm and an outer diameter of about 3.9 mm; while a buffer tube 301 containing 48 optical fibers 110 can have an inner diameter of about 3.4 mm and an outer diameter of about 4.3 mm.

In the kind of cable depicted the buffer tubes 301 are typically contained in a metal tube 303 made, for example, of aluminum. In turn, said metal tube 303 is surrounded by an armour 304 in metal, for example in stainless steel or aluminium alloy.

Referring now to FIGS. 2A and 2B, the structure of an optical fiber 110 according to an embodiment of the present invention is schematically shown, respectively in perspective view and in cross-section.

The optical fiber 110 comprises a core 205 (typically having a diameter of approximately 10 µm), surrounded by a cladding 210 (typically to reach a diameter of approximately 125 µm). The core 205 and the cladding 210 form the transmissive element 125 of the optical fiber 110.

The transmissive element 125 is protected by one or (as in the herein considered example) two superposed coating layers 215 and 220, for example made of UV-curable polymer resin, forming respectively the inner coating layer 215, and the outer coating layer 220.

In the present example, none of the inner coating layer 215 and outer coating layer 220 is colored (i.e., no colorant is added to the polymer resin material thereof).

A coloring layer 225 is provided on the outer coating layer 220. Preferably, the curable colored layer 225 is made of a UV-curable polymer resin material compatible with that of the coating layer, in the present case the outer coating layer 220, encircled by the curable colored layer 225. As "compatible" it is intended that the two materials are capable of forming a chemically stable system, so as to have good interfacial characteristics such to avoid, e.g., delamination. The curable colored layer 225 can also be made of the same UV-curable polymer resin material of the coating layer encircled by the curable colored layer 225, substantially differing in the addition of a colorant, only.

As mentioned in the foregoing, a dozen colors are standardized; usually, the adopted color-coding complies with TIA-598-C color specifications.

Because of the reduced number of different colors available, identification of individual optical fibers among a relatively large number of optical fibers, such as within an optical cable, for operations of e.g. cabling, splicing and maintenance, may be difficult and prone to errors.

According to an embodiment of the present invention, an additional, removable colored layer 230, for example made of a suitable ink, is applied onto the colored layer 225 of the optical fiber 110, the removable colored layer 230 homogeneously covering the curable colored layer 225.

A cable according to the invention is provided with groups of optical fibers sharing the same color for the additional removable colored layer, but differing in the color of the curable colored layer. In this way, it is possible to easily segregate the different groups of optical fibers which are superficially colored with removable colored layers of different colors, making it easier to identify individual optical fibers even when a relatively large number of them is present. For example, a group of 12 optical fibers, each having a curable colored layer 225 of a different color among the dozen of colors available, may have a removable colored layer 230 of a first color; a second group of 12 optical fibers, each having as well a curable colored layer 225 of a different color among the dozen of colors available, may have a removable colored layer 230 of a second color, and so on.

When the optical cable 100 is open, for example by making a cut in and removing a portion of the sheath 105, the different optical fiber groups can be segregated based on the different color of the additional removable colored layer 230 of the optical fibers 110. Within an optical fibers group, the individual optical fibers 110 can then be univocally identified by cleaning or removing the external removable colored layer 230, for example using a suitable solvent, or by simple scratch using finger nails.

By way of example, let the case be considered of a buffer tube containing 48 optical fibers. The optical fibers had each a curable layer colored with a suitable colorant; as an example, blue, orange, green, brown, slate, white, red, black, yellow, violet, pink, and aqua colors are used, according to TIA-598-C. Hence, there were 4 groups of 12 optical fibers colored with the 12 different base UV colors. Each fiber of the first group of 12 was additionally coated with an additional removable colored layer, for example red, homogenously surrounding the whole surface of the fiber. The second, third and fourth groups of 12 optical fibers were additionally colored with, for example, blue, green, and white colors, respectively. Consequently, the buffer tube contained 4 groups of 12 optical fibers colored with the same external color, such that each optical fibers group could be easily segregated. The additional color layer could be cleaned/removed to allow unique identification of each of the 48 optical fibers.

The manufacturing of an optical fiber according to the invention can be carried out according to methods known in the art.

For example, a conventional coloring machine (commercially available by Medek & Schomer GmbH) was used to apply the additional removable colored layer onto the optical fibers. The optical fibers were provided with a curable colored layer via a standard process, such as that described in U.S. Pat. No. 5,334,421. A colored fiber was then drawn through a rigid die ink applicator, of the type ordinarily used to apply color coding inks to optical fibers. The applicator die comprised a reservoir mounted on housing and an entrance die of 0.290 mm at a first end of the housing and an exit die of 0.300 mm at the second end. The applicator die was continually wetted with a solvent-based ink such that the optical fiber has been uniformly coated. Once the surface of the optical fiber was wetted, it passed through a couple of UV light radiators 1 m long, which effectively dried the ink.

Manufacturing tests were successfully carried out at a drawing speed of approximately 1000 m/s, using black solvent-based ink VIDEOJET 16-8420 (commercial product of Videojet Technologies Inc.), of the type suitable for fiber ring marking applications. Once the additional, removable colored layer was dried, it was removed with few passages of a cleaning cloth or paper wetted in 99% MOSSTANOL L (commercial product of Fred Holmberg & Co.) an alcohol mixture comprising ethanol and isopropanol.

Preferably, suitable solvent-based inks of at least four different colors are used, that can be applied and dried using the conventional coloring process described before.

A test carried out with an ink containing an inorganic pigment ($TiO_2$) proved to be somewhat problematic from the manufacturing point of view. More specifically, in this case the application of the additional removable colored layer resulted less uniform.

Preferably, the additional removable colored layer 230 has a limited thickness, e.g. about 25 μm, and uniform, to avoid disuniformity in the fiber diameter (which may be a source of undesired microbending), the layer being essentially concentric to the transmissive element 115 of the optical fiber.

In addition or in alternative to UV drying, a conventional oven for solvent-based ink drying may be used to dry the ink forming the homogeneous removable colored layer; the convection oven temperature used will depend on the type solvent based ink.

Although in the foregoing an invention embodiment has been described wherein the optical fibers comprised two coating layers (inner coating and outer coating) and a coloring layer formed over the outer coating, this is not limitative to the present invention, which applies as well to optical fibers comprising a single, colored coating layer, or to optical fibers comprising two coating layers, one of which is colored.

The invention claimed is:

1. An optical cable comprising at least two optical fibers comprising:
    an optically transmissive element;
    at least one curable colored layer surrounding the optically transmissive element; and
    an additional removable colored layer surrounding and homogeneously covering the colored layer,
wherein said optical fibers have the at least one curable colored layer of a same color and wherein said optical fibers differ from one another in the color of their additional removable colored layer.

2. The optical cable of claim 1, comprising more than twelve optical fibers.

3. The optical cable of claim 2, comprising at least two groups of optical fibers differing from one another in the color of their additional removable colored layer.

4. The optical cable of claim 1, wherein the optical fibers are in at least one buffer tube.

5. The optical cable of claim 4, wherein said at least one buffer tube comprises more than one buffer tube, said buffer tubes being in a coaxial or stranded configuration.

6. The optical cable of claim 1, comprising reinforcing elements.

7. A method for identifying an optical fiber in an optical cable comprising at least a first group and a second group of optical fibers, wherein each of the optical fibers comprises:
    an optically transmissive element;
    at least one curable colored layer surrounding the optically transmissive element; and
    an additional removable colored layer surrounding and homogeneously covering the curable colored layer,
and wherein the fibers of the first group having the additional removable colored layer of the same color and the fibers of the first group differing from one another in the color of their at least one curable colored layer, and the fibers of the second group having the additional removable colored layer of the same color and the fibers of the second group differing from one another in the color of their at least one curable colored layer, the color of the additional removable colored layer of the fibers of the first group differing from the color of the additional removable colored layer of the fibers of the second group comprising:
    accessing the first and second groups of optical fibers;
    selecting one of the groups on the basis of the color of the removable colored layer;
    removing the additional removable colored layer of at least one optical fiber of a selected group; and
    identifying the optical fiber on the basis of the color of the curable colored layer.

* * * * *